Dec. 3, 1940.   O. U. SCHOFIELD   2,223,922
SPREADER
Filed Feb. 5, 1940
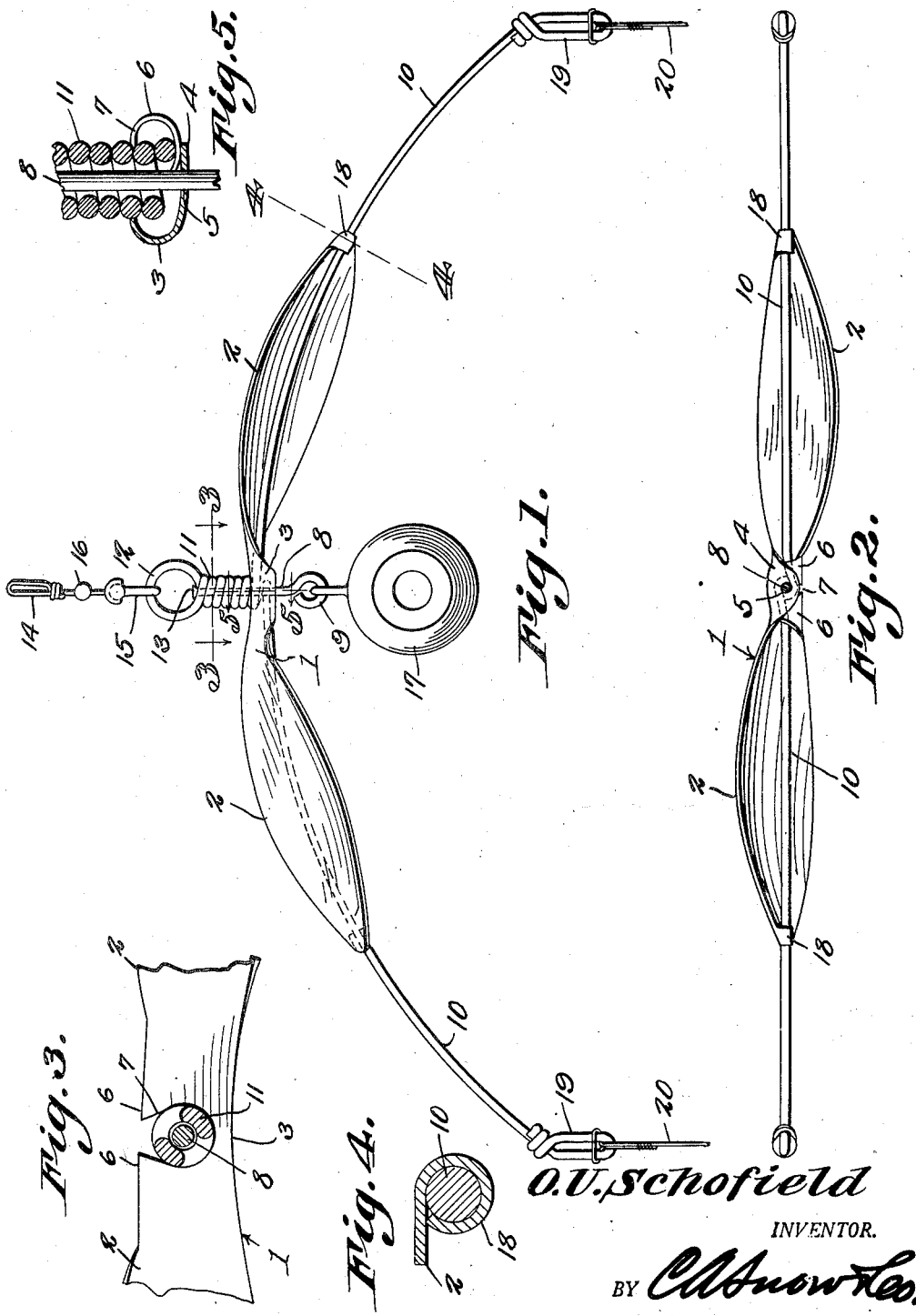
O. U. Schofield
INVENTOR.
BY C. A. Snow & Co.
ATTORNEYS.

Patented Dec. 3, 1940

2,223,922

UNITED STATES PATENT OFFICE 2,223,922

SPREADER

Otis U. Schofield, Lorain, Ohio

Application February 5, 1940, Serial No. 317,403

5 Claims. (Cl. 43—28)

This invention relates to a spreader designed primarily for use in fishing, one of the objects being to provide a spreader which, when moved within a body of water, will rotate freely.

It is well known, and is customary when fishing from a boat, pier, or through the ice, to lower the line to a predetermined depth and thereafter move it upwardly and downwardly for the purpose of attracting fish thereto. Heretofore, where it has been desired to use two or more hooks for holding bait, spreading devices have been attached to the lines and the hooks have been suspended from the ends of these so that they would not become entangled with the line.

An object of the present invention is to provide a spreading device so constructed that when the line is moved within the body of water it will be caused to rotate relative to the line and without producing a twist in the line.

It is a still further object to provide a spinning spreader which is cheap to manufacture, can be applied easily to a line, and will rotate freely when moved within a body of water thereby adapting it for fishing as before explained, trolling, etc.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing—

Figure 1 is a front elevation of the device.

Figure 2 is a bottom plan view, the sinker supporting stem being shown in section.

Figure 3 is an enlarged section on line 3—3 of Figure 1.

Figure 4 is an enlarged section on line 4—4 of Figure 1.

Figure 5 is an enlarged section on line 5—5 of Figure 1.

Referring to the figures by character of reference, 1 designates a single length of metal or the like having its end portions twisted to provide blades 2 which, when drawn through a body of water, will cause the device to rotate. This strip of metal can be of any desired configuration and the pitch of the blades formed by the end portions 2 can obviously be varied to suit the requirements.

The middle or central portion of the metal strip 1 which is looped between the blades 2 has a downwardly extended flange 3 merging at its lower edge into a laterally extended ear 4 provided with an opening 5. The top of the metal portion of the strip is also bent downwardly, as indicated at 6 so as to lap the ear 4 as shown in Fig. 5, this downwardly turned portion being slotted as at 7 and said slot being extended into the top portion of the metal strip so that the opening 5 is exposed thereunder.

A stem 8, preferably formed of a stiff wire, is extended through slot 7 and opening 5 and has an eye 9 at its lower end.

A length of wire of any suitable stiffness is bent to provide opposed arcuate arms or sweeps 10 which extend longitudinally under the blades 2 from end to end thereof and are joined by a twisted portion 11 forming a sleeve having an eye 12 at its upper end. This sleeve is extended about the stem 8 so as to form a holding means for the stem 8. This stem has one end upset as shown at 13 to prevent its withdrawal from the sleeve 11. Said coiled portion or sleeve 11 is fitted within the opening 7 as shown in Fig. 3.

A pair of links indicated generally at 14 and 15 are connected by a universal joint 16 so that they can rotate freely relative to each other and one of these links, 15, is connected to the eye 12 while the other link 14 is adapted to be attached to the fishing line. A sinker 17 is adapted to be attached to the eye 9 at the lower end of the stem 8.

The outer end of each of the blades 2 has a tongue 18 integral therewith and this tongue is bent about the adjacent portion of arm or sweep 10 so as to hold the same properly assembled with the blades. The outer end of each arm or sweep 10 has a loop 19 to which a fish hook is adapted to be connected in the usual manner, a portion thereof being indicated at 20.

Obviously wire 10 serves to stiffen the blades 2 which thus can be made of comparative light material.

The parts are assembled in a very simple and efficient manner so that the blades and the arms 10 can rotate freely relative to the link 14 and the line attached thereto due to the provision of the universal joint 16 constituting a swivel connection. After bait has been attached to the respective hooks and the line has been lowered to a desired depth, said line can be raised and lowered and this obviously will cause resistance of water to the movement of the blades 2 to produce a rotating motion which will cause the bait to move in a circle as it travels upwardly or downwardly. Consequently the fish will be attracted thereto and the results obtained have been found to be superior to those where other bait-carrying means are employed. The particular connection shown between the blades 2 and the line can be fabricated easily and at low cost and at the same time provides a very durable connection.

It is to be understood of course that any suitable material can be used in the construction of the device, the proportions can be varied to meet the requirements, and various other changes can be made without departing from the invention as claimed.

What is claimed is:

1. The combination with a sweep including oppositely extending arms, an integral coil connecting the arms, and a swivel means for attaching the coil to a line, a sinker supporting means carried by and depending from the coil, and oppositely pitched blades mounted on the respective arms.

2. A spreader including a sweep having terminal hook supporting means and an intermediate coil, swivel means connecting the coil to a line, a single length of sheet material mounted at its center around the coil and having oppositely extended twisted blades extending along and joined to the sweep, and a sinker carrying means supported by the coil.

3. A spreader including a sweep having terminal hook supporting means and an intermediate coil constituting a sleeve, swivel means for connecting said coil to a line, a stem supported by the coil, a sinker carried by the stem, and a single length of sheet material mounted on the coil and stem at its center and having oppositely extending twisted blades extending along and joined to the sweep.

4. A spreader including a single length of wire forming a sweep having terminal hook supporting means and an intermediate coil constituting a sleeve, swivel means connecting said coil to a line, a sinker supporting stem supported within and extending below the coil, and a single strip of sheet material having its intermediate portion folded to provide a lower portion through which the stem is extended and an upper portion embracing the coil, the end portion of said strip providing twisted blades extending along and connected to the sweep in opposite directions from the coil.

5. A spreader including a single length of wire shaped to provide terminal hook supporting means, an intermediate coil constituting a sleeve, and arms extending from the sleeve to the hook supporting means, swivel means for connecting said coil to a line, a stem supported within the coil, a sinker carried thereby, and a strip of sheet material folded between its ends to provide a lower stem receiving portion and an upper coil embracing portion, said strip having its end portions extended along the arms and twisted to form propeller blades, and means at the outer ends of said blades for embracing the arms to hold said end portions to the arms.

OTIS U. SCHOFIELD.